United States Patent [19]

Reichel et al.

[11] Patent Number: 4,712,093

[45] Date of Patent: Dec. 8, 1987

[54] AUDIBLE AUDIO LEVEL INDICATOR

[75] Inventors: Kenneth R. Reichel, Hudson; Steve Hebrock, Akron, both of Ohio

[73] Assignee: Audio Technica U.S., Inc., Stow, Ohio

[21] Appl. No.: 850,251

[22] Filed: Apr. 10, 1986

[51] Int. Cl.[4] .............................................. G08B 3/00
[52] U.S. Cl. .................................... 340/540; 340/566
[58] Field of Search ............... 340/573, 566, 540, 691, 340/815.11; 367/93, 94

[56] References Cited

U.S. PATENT DOCUMENTS

| | | | |
|---|---|---|---|
| 3,440,349 | 4/1969 | Gibbs | 340/540 |
| 3,697,973 | 10/1972 | Stevens et al. | 340/540 |
| 4,052,720 | 10/1977 | McGregor et al. | 340/566 |
| 4,092,633 | 5/1978 | Fletcher et al. | 340/573 |
| 4,225,859 | 9/1980 | Zetting et al. | 340/566 |
| 4,250,499 | 2/1981 | Kienzle | 340/566 |
| 4,307,385 | 12/1981 | Evans et al. | 340/573 |
| 4,416,155 | 11/1983 | Kirby | 340/373 |
| 4,529,973 | 7/1985 | Blamberg | 340/573 |

*Primary Examiner*—Michael J. Tokar
*Assistant Examiner*—Hezron E. Williams
*Attorney, Agent, or Firm*—Welsh & Katz, Ltd.

[57] ABSTRACT

A system for monitoring the level of an intelligence-containing audio frequency signal wherein an operator audibly monitors the signal but cannot adequately monitor a visual level indicator. The system utilizes a threshold detector which compares the level of an audio frequency signal to a preselected level and generates a control signal if the audio frequency signal exceeds the threshold. The system further includes a gate which couples a tone to the headphones of the operator in response to generation of the control signal. In an alternative embodiment, if a second threshold is exceeded, the threshold detector generates a second control signal which changes the tone signal frequency.

12 Claims, 2 Drawing Figures

AUDIBLE AUDIO LEVEL INDICATOR

This invention relates generally to the field of audio level measurement, and more particularly, to a novel audio level indicator which provides an audible indication when an audio signal exceeds a threshold.

In existing recording studio systems, or systems in which the level of an intelligence-containing audio signal (i.e., voice, music, coded information, etc.) must be monitored, it is common to use a visual level indicator, such as a meter. Typically, an operator must continually monitor this meter to observe when the monitored level exceeds a predetermined limit. Unfortuantely, in some situations the operator cannot properly use a visual level indicator due to limitations imposed by the job requirements or the environment which make it impossible to adequately monitor the indicator. In addition, visually handicapped or fatigued operators also may not be able to properly monitor a visual indicator. Thus, to be able to monitor an audio level by means of an audible indicator would be highly desirable.

In the prior art, a number of systems exist for monitoring ambient sound levels. For example, systems for monitoring the level of ambient sound exist which activate a set of lights to give a visual indication of the level of sound or which couple an alarm signal to a pair of headphones when an unusual ambient sound event occurs. These systems, however, do not provide for continuous monitoring of an intelligence-containing signal to permit an audible level indication to an operator unable to adequately monitor a visual indicator.

It is accordingly an object of this invention to provide a novel audible audio level monitoring system.

It is another object of the invention to provide a novel monitoring system utilizing a threshold detector to gate a continuously operating tone generator to sound an audible tone whenever a monitored audio intelligence-containing signal exceeds a predetermined threshold.

It is yet another object of the invention to provide a novel monitoring system utilizing a threshold detector for gating a continuously operating tone generator to sound an audible tone whenever a monitored audio frequency intelligence containing signal exceeds a predetermined threshold, and for changing the frequency of the audible tone whenever the monitored audio frequency intelligence containing signal level exceeds a second threshold.

Briefly, according to one embodiment of the invention, a system is provided for monitoring the level of an intelligence-containing audio frequency signal in a system wherein an operator audibly monitors the electrical audio frequency signal by means of a sound transducer. The system comprises a threshold detector for comparing the level of the audio frequency signal to a preselected threshold level, and for generating a control signal in response to the level of the audio frequency signal exceeding the preselected threshold. The system further comprises a tone generator for continuously generating an audio frequency tone signal of preselected frequency and a gate for coupling the audio frequency tone to the sound transducer in response to the control signal. In an alternative embodiment, the threshold detector further comprises circuitry for generating a second control signal in response to the audio frequency signal level exceeding a second threshold level, and the tone generator comprises circuitry for generating a second preselected tone signal in response to the second control signal.

BRIEF DESCRIPTION OF THE DRAWINGS

The invention, together with further objects and advantages thereof, may be understood by reference to the following description taken in conjunction with the accompanying drawings.

DETAILED DESCRIPTION OF THE PREFERRED EMBODIMENT

Figure 1:
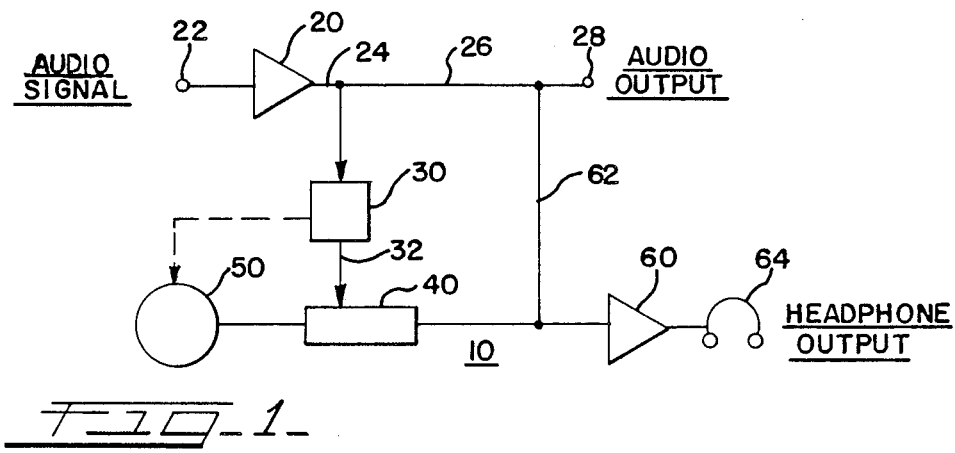
FIG. 1 is a generalized block diagram illustrating a specific embodiment of an audible audio level indicator system according to the invention.

FIG. 1 shows a generalized block diagram illustrating a specific embodiment of an audible audio level indicator system 10 according to the invention. The system is suitable for use in an environment in which the level of an audio frequency (i.e., frequencies from about 20 hz to 20 khz) intelligence-containing signal (e.g., music, voice, coded information, etc.) is monitored, such as in a recording studio. The audio frequency intelligence-containing signal is applied to an amplifier 20 via input 22 where it is amplified and coupled to an output 24 of the amplifier 20. This output signal is coupled to an audio output 28 via a conductor 26 and to an amplifier 60, via a conductor 62. The signal coupled to the amplifier 60 is amplified and coupled to a sound transducer 64, such as a set of operator headphones, to permit operator monitoring of the intelligence-containing audio frequency signal.

The output audio frequency signal from the amplifier 20 is also coupled to a threshold detector 30, as shown. The threshold detector 30 compares the level of the audio frequency signal to at least one predetermined threshold and produces a control signal on its output 32 in response to the result. Thus, in one embodiment, a control signal is produced if the level of the audio frequency signal exceeds a predetermined threshold level, while in another embodiment, a second control signal is generated if the audio frequency signal exceeds a second threshold.

The control signal from the threshold detector 30 is coupled, as shown, to a gating circuit 40 which responds to the control signal to gate an audio frequency tone signal from a tone generator 50. The continuously operating tone generator 50 generates a tone signal of preselected frequency which is coupled to the gating circuit 40, as shown. The gating circuit 40 couples the tone signal through to the amplifier 60 when gated on by the control signal from the threshold detector 30. The amplifier 60 amplifies the tone signal together with the audio frequency intelligence-containing signal from the conductor 62 and couples the combined signal to the earphones 64. Thus, the tone will be heard over the earphones when the level of audio frequency intelligence-containing signal exceeds the preselected threshold. In an alternative embodiment, second control signal from the threshold detector 30 is coupled to the tone generator 50 when a second threshold is exceeded. This causes the tone generator 50 to change the frequency of the tone signal to a second preselected frequency, thereby alerting the operator that the second threshold has been exceeded.

Figure 2:
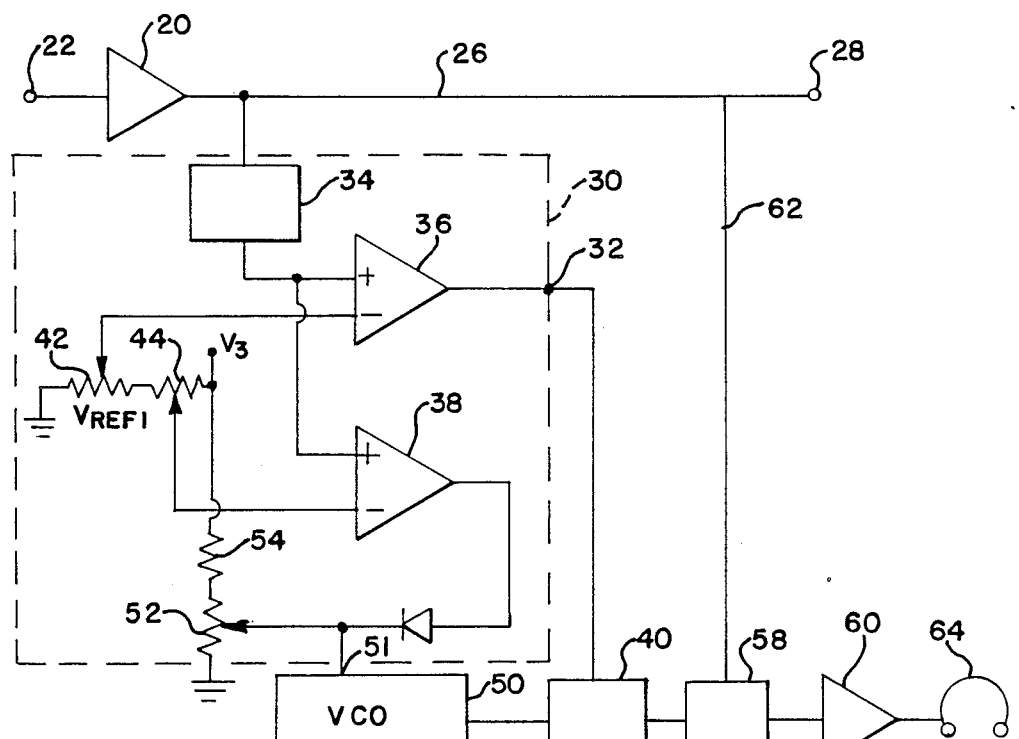
FIG. 2 is a detailed schematic diagram illustrating a specific embodiment of the system of FIG. 1 including alternative features.

Referring now to FIG. 2, there is shown a detailed schematic diagram illustrating a specific embodiment of the audible audio level indicator system 10 according to the invention. The intelligence containing audio frequency signal is coupled to the system 10 at the input 22 and amplified by a conventional audio amplifier 20. This amplified signal is then coupled to a combining circuit 58 (i.e., a conventional summing circuit) and to a conventional rectifying circuit 34 which is part of the threshold circuit 30.

The rectifying circuit 34 rectifies the audio frequency signal converting it to a DC voltage representative of the level of the audio frequency signal. This DC voltage is coupled, as shown, to one input of an operational amplifier 36 (e.g., a 741 operational amplifier such as marketed by Texas Instruments). A resistor voltage divider network composed of a resistor 42, a resistor 44, and a source voltage $V_s$, as shown, provides a references voltage ($V_{REF1}$) which is coupled from the wiper of the resistor 42 to the second input of the amplifier 36. This voltage is preselected by adjusting the wiper of the resistor 42 to provided a value representing a preselected threshold against which the DC voltage is compared. Thus the amplifier 36 functions as a comparator circuit. If the DC voltage of the rectifier 34 is greater than the threshold, then the output of the amplifier 36 goes high.

The output of the operational amplifier 36 is coupled to the control input of a gating circuit 40 (e.g., a TL604 analog switch such as manufactured by Texas Instruments) which is switched on by a high control signal from the amplifier 36. Coupled to the signal input of the gating circuit 40 is an audio frequency tone generated by a conventional voltage controlled oscillator 50 (VCO) as shown. The frequency of the tone is preselected by adjusting a voltage coupled to control voltage input of the voltage controlled oscillator 50 from the wiper of a resistor 52 which is coupled, as shown, to a resistor 54 and the voltage source $V_s$. The audio frequency tone of preselected frequency from the oscillator 50 is coupled through the gating circuit 40, when the control input signal is high, to the combining circuit 58. The combining circuit 58 combines the tone with the audio intelligence containing signal from the amplifier 20 and couples the resultant signal to the audio amplifier 60 and through to the headphones 64, as shown. If the level of of the intelligence containing audio frequency signal falls back below the threshold, the control signal is removed and the gate 40 decouples the tone generator 50 and the combining circuit 58.

In an alterntive embodiment, the threshold circuit 30 includes a second operational amplifier 38 (e.g., a 741 operational amplifier such as manufactured by Texas Instruments), one input of which is coupled as shown to the DC voltage from the rectifier circuit 34. The second input of operational amplifier 38 is a reference voltage $V_{REF2}$ coupled from the wiper of the resistor 44, as shown. This reference voltage is preselected by adjusting the wiper of the resistor 44 to obtain a voltage representative of a preselected second threshold. When this second threshold is exceeded by the audio signal DC voltage from the rectifier circuit 34 the output of the amplifier 38 goes high. This signal is coupled through a diode 53 to the control voltage input 51 of the voltage controlled oscillator 50 changing the voltage coupled from the resistor 52 there by changing the frequency of the tone generated by the voltage controlled oscillator 50. As a result, when the second threshold level is exceeded by the level of the input audio frequency intelligence controlling signal, the frequency of the tone coupled through to the operator headphone 64 is changed thereby indicating to the operator that the second threshold has been exceeded.

A specific embodiment of the audible audio level indicator system has been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A system for directly monitoring the level of an intelligence-containing electrical audio frequency signal prior to conversion to audible sound wherein an operator audibly monitors the audio frequency signal by means of a sound transducer, comprising:

threshold detection means for comparing the level of the intelligence-containing audio frequency signal to a preselected threshold level, and for generating a control signal in response to the level of the intelligence-containing audio frequency signal exceeding the preselected threshold level;

tone generating means for continuously generating an audio frequency tone signal of preselected frequency; and gating means for coupling the audio frequency tone to the sound transducer in response to the control signal.

2. The system of claim 1 wherein the threshold detection means comprises rectifying means for converting the intelligence containing audio frequency signal to a dc voltage representative of the level of said audio frequency signal, and comparator means for comparing the dc voltage to a reference representative of the preselected threshold level.

3. The system of claim 2 wherein the threshold detector means further comprises adjustable reference voltage means for permitting preselection of the reference voltage.

4. The system of claim 1 wherein the threshold detector means further comprises means for generating a second control signal in response to the level of the intelligence containing audio frequency signal exceeding a second preselected threshold, and wherein the tone generating means further comprises means for changing the preselected frequency of the audio frequency tone signal to a second preselected frequency in response to the second control signal.

5. The system of claim 1 wherein the tone generating means further comprises means for adjusting the frequency of the audio frequency tone signal to permit preselection of the frequency of the audio frequency tone signal.

6. The system of claim 1 wherein the gating means further comprises means for decoupling the audio frequency tone signal from the sound transducer in response to removal of the control signal.

7. The system of claim 4 wherein the means for generating the second control signal further comprises means for adjusting the second threshold to permit preselection of the second threshold.

8. The system of claim 1 further comprising combining means for combining the audio frequency tone signal from the gating means with the intelligence containing audio frequency signal and for coupling the combined signal to the sound transducer.

9. The system of claim 1 wherein the sound transducer is a set of headphones.

10. The system of claim 5 wherein the tone generating means comprises a voltage controlled oscillator and wherein the means for adjusting comprises a variable resistor network, coupled to the voltage controlled oscillator, for selection of a frequency control voltage thereby determining the preselected frequency of the audio frequency tone signal.

11. A method for directly monitoring the level of an intelligence containing electrical audio frequency signal prior to conversion to audible sound in a system wherein an operator audibly monitors the intelligence containing signal by means of a sound transducer, comprising the steps of:

generating a control signal in response to the level of the audio frequency signal exceeding a preselected threshold level;

continuously generating an audio frequency tone of preselected frequency;

coupling the audio frequency tone signal to the sound transducer in response to the control signal.

12. The method of claim 11 further comprising the steps of generating a second control signal in response to the level of the intelligence containing audio frequency signal exceeding a second predetermined threshold, and changing the preselected frequency of the audio frequency tone signal to a second preselected frequency in response to the second control signal.

* * * * *